(12) United States Patent
Harada

(10) Patent No.: US 6,900,901 B2
(45) Date of Patent: ***May 31, 2005

(54) IMAGE RECORDING DEVICE

(75) Inventor: Akinori Harada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 904 days.

This patent is subject to a terminal disclaimer.

(21) Appl. No.: 09/887,004

(22) Filed: Jun. 25, 2001

(65) Prior Publication Data

US 2001/0055491 A1 Dec. 27, 2001

(30) Foreign Application Priority Data

Jun. 26, 2000 (JP) .......................................... 2000-191518

(51) Int. Cl.[7] .............................................. G06K 15/00
(52) U.S. Cl. ........................................ 358/1.1; 358/1.7
(58) Field of Search ........................ 358/1.1, 1.7, 1.8, 358/1.9, 302, 518, 520, 514; 347/40, 10, 49, 129, 130, 132

(56) References Cited

U.S. PATENT DOCUMENTS

2004/0183842 A1 * 9/2004 Kobayashi et al. ............ 347/10
2004/0239721 A1 * 12/2004 Usuda ........................... 347/40

FOREIGN PATENT DOCUMENTS

JP          7-22649        1/1995        ........... H01L/33/00

* cited by examiner

Primary Examiner—Arthur G. Evans
(74) Attorney, Agent, or Firm—Sughrue Mion, PLLC

(57) ABSTRACT

When a recording starting point of a color photosensitive material reaches a position on which light beams are focused by a condenser lens and a reflecting mirror, a light beam is emitted from a red organic EL element of a light source by a controller, and red image data corresponding to a plurality of lines is transferred to a DMD. In accordance with the image data, on-off control of micromirrors of the DMD is carried out, and the red light beam emitted from the light source is made incident on the DMD. When the micromirrors are on, the incident light beam is reflected toward the reflecting mirror. The light beam is focused onto a recording surface of the color photosensitive material by the condenser lens and the reflecting mirror, and red exposure is carried out. Subsequently, green exposure and blue exposure are carried out in the same way.

12 Claims, 10 Drawing Sheets

F I G. 2
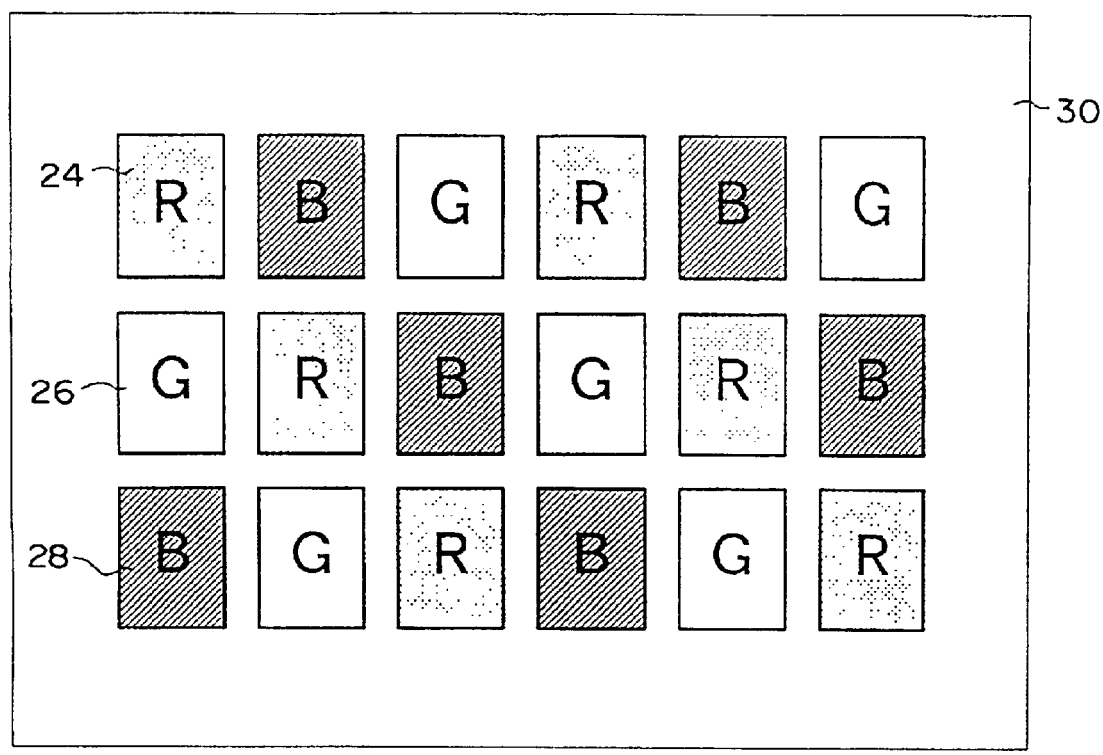

F I G. 3
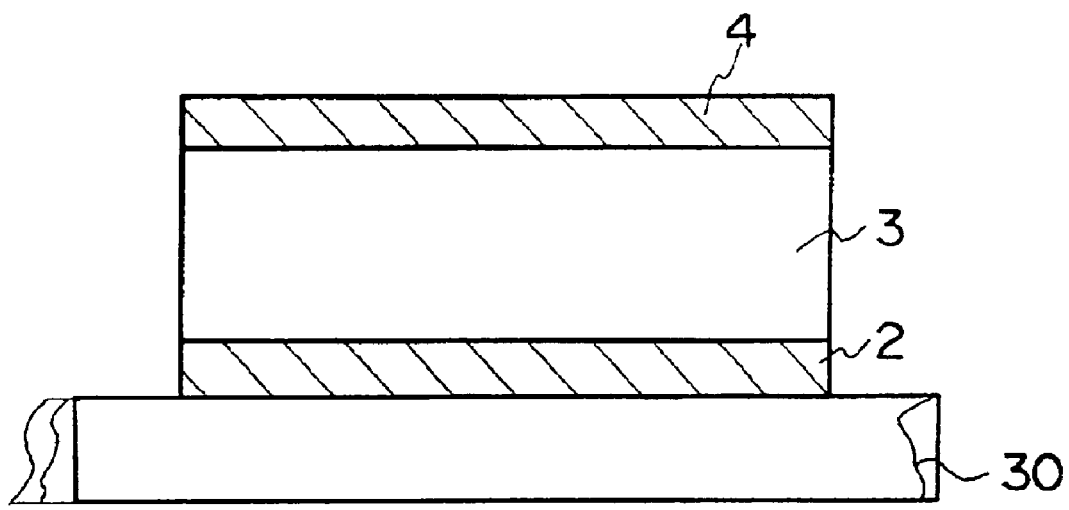

F I G. 5 A
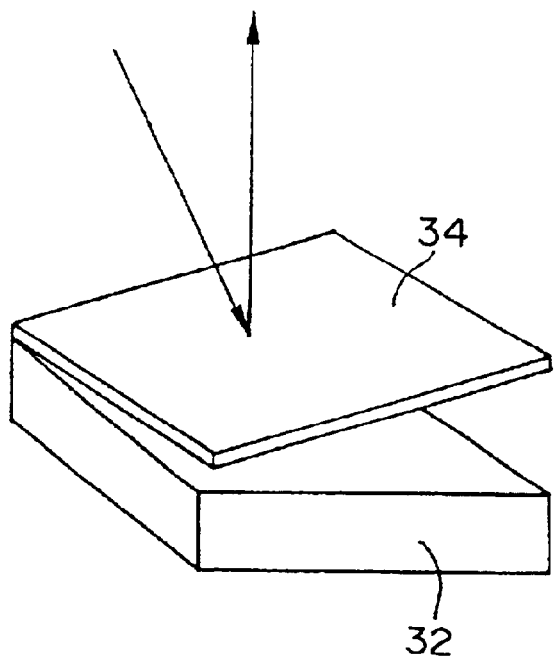
F I G. 5 B
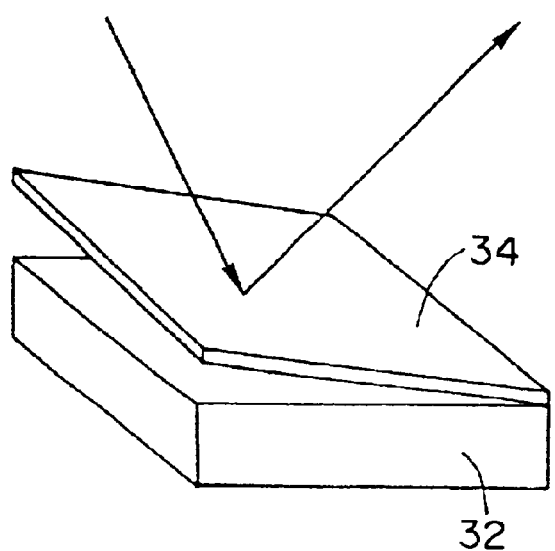

F I G. 6
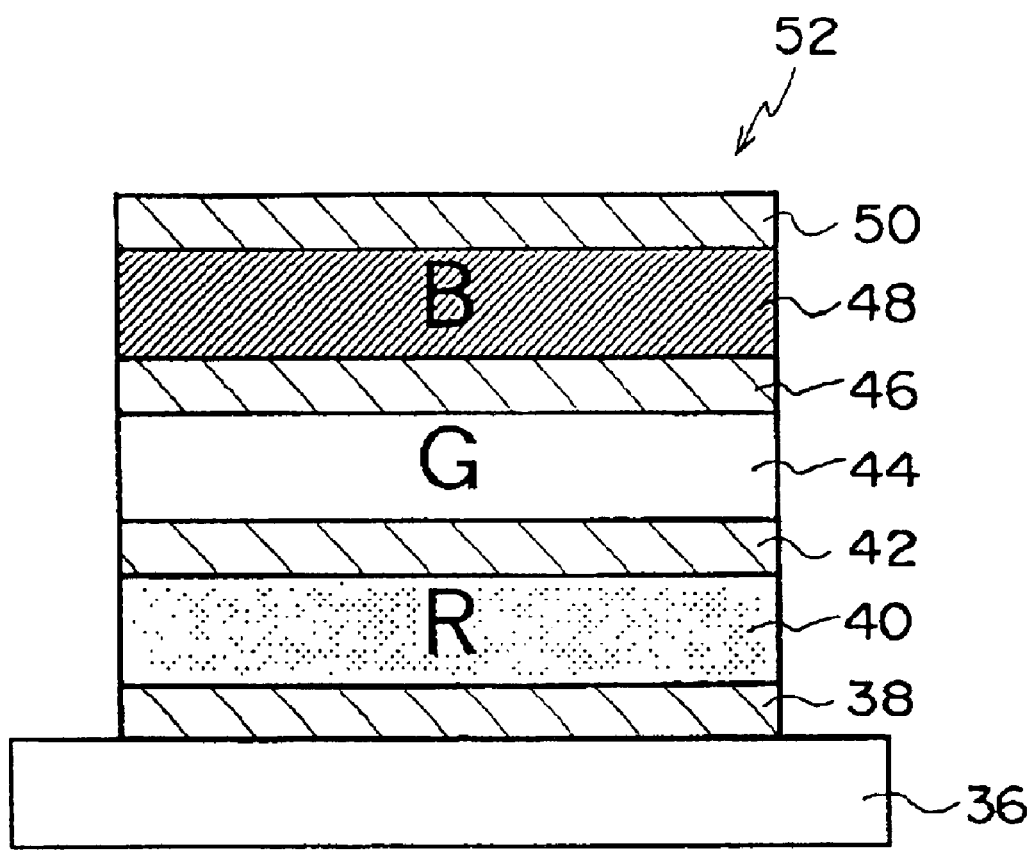

F I G. 7
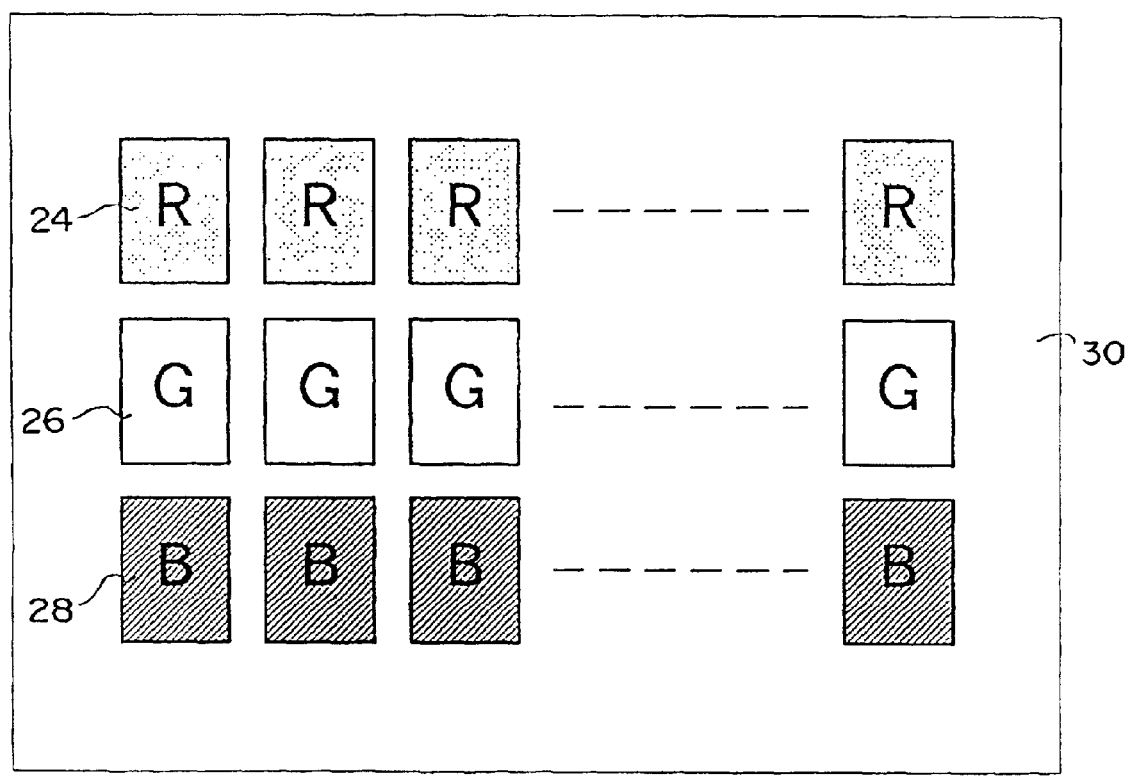

IMAGE RECORDING DEVICE

BACKGROUND OF THE INVENTION

1. Field of the Invention

The present invention relates to an image recording device, and particularly to an image recording device suitable for recording images by exposing, for each color, color photosensitive materials having spectral sensitivity in the visible region.

2. Description of the Related Art

In a full-color image recording device in which light beams emitted from a light source are externally modulated by using a one- or two-dimensional light shutter array, a white lamp such as a tungsten lamp has been conventionally used as the light source. However, in the image recording device in which a white lamp is used as the light source and the light shutter array is used as an external modulation element, the following problems arise: (1) white lamps have low luminous efficiency and cannot obtain the amount of light required to expose color photosensitive materials; (2) due to short life span, white lamps need to be frequently replaced and are therefore inconvenient; and (3) when a white lamp is used, color separation needs to be carried out by using a color wheel or the like having filters of R, G, and B, and since a rotating mechanism for mechanically rotating the color wheel is necessary, the device becomes large, and it takes time to switch the filters.

An organic electroluminescence element in which a fluorescent organic material is used for a light-emitting layer is referred to as an organic EL element. Organic EL elements have advantages over other light emitting elements in that they are easy to manufacture, small and lightweight. Recently, there have been obtained high-quality organic electroluminescence elements which are as good as light emitting diodes (LEDs) formed of inorganic materials in terms of emission intensity, luminous efficiency, durability, and the like. Therefore, application of high-quality organic electroluminescence elements to exposure heads for exposing photosensitive materials such as silver halide photosensitive materials has been studied. For example, an optical recording device, which includes an optical writing unit having an array of organic EL elements for the respective R, G, and B, is suggested in Japanese Patent Application Laid-Open (JP-A) No. 7-22649. Since the array of organic EL elements for the respective R, G, and B is used in this device, color separation by filters and a rotating mechanism such as a color wheel are not necessary.

In the image recording device described in JP-A No. 7-22649, the array of organic EL elements used as the light source is directly modulated in accordance with image signals. However, since the organic EL elements form a diffusion light source, a problem arises in that direct modulation of the organic EL elements results in optical crosstalk. Further, the array of the organic EL elements is usually laminated on a common substrate, and therefore, thermal crosstalk is also generated.

SUMMARY OF THE INVENTION

In view of the conventional problems described above, an object of the present invention is to provide an image recording device which is small and inexpensive, prevents generation of crosstalk, and with which high-quality images can be obtained at high speed.

In order to achieve the above object, the image recording device of the present invention includes: a light source for independently emitting red, green and blue light beams, the light source having an organic electroluminescence element; and a light modulator for modulating the light beams from the light source, the light modulator having light shutters arranged in an array, the light shutters being controlled on-off for each color in accordance with signals representing an image to be recorded.

In the image recording device according to the present invention, the light source includes at least an organic electroluminescence element and can independently emit light beams of red, green, and blue. Accordingly, a color wheel having filters of the respective R, G, and B for color separation, a rotating mechanism for mechanically rotating the color wheel, and switching of the filters are not necessary. As a result, the device can be made small, and images can be recorded at high speed.

Moreover, in the light modulator, the light shutters are arranged in an array, and light beams emitted from the light source are modulated by on-off control of the light shutters for the respective colors in accordance with signals representing an image to be recorded. In this way, external modulation is carried out by using the light modulator in which the light shutters are arranged in an array. Therefore, even if the organic EL elements are used as the light source, there is no problem of optical crosstalk, which is caused by the organic EL elements forming a diffusion light source, nor of thermal crosstalk, which is caused by the organic EL elements being provided on a single substrate. As a result, high-quality images can be obtained. Further, the organic EL elements have an amount of light sufficient for exposure and sufficient durability, and can be easily manufactured by a film-making process such as vapor deposition as compared with other light emitting elements. Therefore, cost required for the device can be reduced.

In the above image recording device, as the light source, there can be used a light source in which organic electroluminescence elements each emitting a red light beam, organic electroluminescence elements each emitting a green light beam, and organic electroluminescence elements each emitting a blue light beam are respectively arranged in a predetermined direction; a light source in which organic electroluminescence elements each emitting a red light beam, organic electroluminescence elements each emitting a green light beam, and organic electroluminescence elements each emitting a blue light beam are arranged in a matrix; a light source in which a light-emitting layer emitting a red light beam, a light-emitting layer emitting a green light beam, and a light-emitting layer emitting a blue light beam are laminated so that the light beams are emitted in the same direction; or the like.

Further, as the light modulator, there can be used a light shutter array in which light shutters, each having a cell whose light transmittance is adjustable based on image signals, are arranged in an array, or a micromirror array device in which micromirrors, whose reflection angles are respectively adjustable based on image signals, are arranged in an array.

BRIEF DESCRIPTION OF THE DRAWINGS

FIG. 2 is a plan view showing an array of organic EL elements of the image recording device according to the first embodiment.

FIG. 3 is a cross-sectional view schematically showing the structure of the organic EL element.

FIGS. 5A and 5B are views for explaining the operation of a micromirror forming the DMD.

FIG. 6 is a cross-sectional view schematically showing the structure of a laminated organic EL element.

FIG. 7 is a plan view showing an array of organic EL elements of an image recording device according to a second embodiment.

DESCRIPTION OF THE PREFERRED EMBODIMENTS

Hereinafter, embodiments of the present invention will be described in detail with reference to the drawings.

First Embodiment

Figure 1:
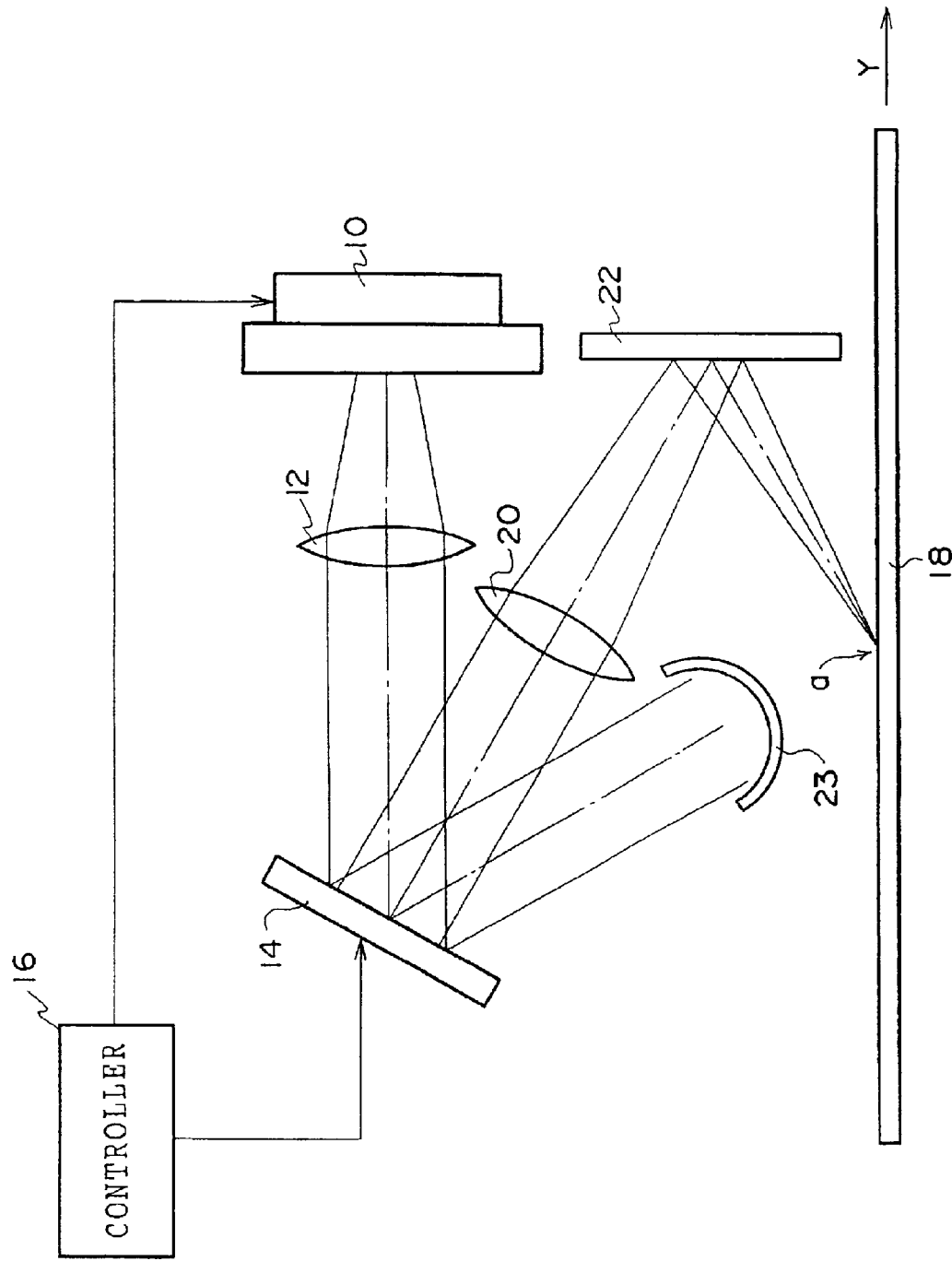
FIG. 1 is a structural diagram schematically showing the structure of an image recording device according to a first embodiment.

FIG. 1 shows the schematic structure of an image recording device according to a first embodiment of the present invention. As shown in FIG. 1, the image recording device includes a light source 10 formed by organic electroluminescence elements (hereinafter referred to as "organic EL elements"). A collimator lens 12 which collimates light beams emitted from the light source 10 is disposed at the light-exiting side of the light source 10, and a reflection type light modulator (referred to as a "DMD", i.e., Digital Micromirror Device) 14 is disposed at the light-exiting side of the collimator lens 12. The light source 10 and the DMD 14 are connected to a controller 16.

On the optical axes of the light beams reflected by micromirrors of the DMD 14 when they are on (which will be described later), a condenser lens 20 and a reflecting mirror 22 are disposed so as to focus the light beams reflected by the DMD 14 onto a recording surface of a color photosensitive material 18. Further, a light absorber 23 is disposed in a direction in which the light beams are reflected by the micromirrors when they are off (which will also be described later).

As shown in FIG. 2, the light source 10 is an organic EL array in which organic EL elements 24 that each emit a red light beam (hereinafter referred to as "red organic EL elements"), organic EL elements 26 that each emit a green light beam (hereinafter referred to as "green organic EL elements"), and organic EL elements 28 that each emit a blue light beam (hereinafter referred to as "blue organic EL elements") are formed in a matrix on a single transparent substrate 30. The organic EL elements 24, 26, and 28 for the respective colors are uniformly disposed so that the optical axes of red light beams, green light beams, and blue light beams coincide with one another. Moreover, the red organic EL elements 24, the green organic EL elements 26, and the blue organic EL elements 28 are wired so as to independently emit light beams of the respective colors.

As shown in FIG. 3, each of the organic EL elements is formed by sequentially laminating on a transparent substrate 30 a transparent ITO electrode 2 that is used as an anode, an organic compound layer 3 including a light-emitting layer, and a back plate 4 that is used as a cathode. The organic EL element emits light when a voltage is applied between the transparent ITO electrode 2 and the back plate 4, and the light exits from the side of the transparent substrate 30. Further, in order to prevent moisture or oxygen in the air from entering the organic EL element, a sealing layer covering the entire element can be provided.

The organic EL element having the laminated structure described above can be manufactured by appropriately using a well-known method such as the methods described in "Strategy for Development of Organic EL Elements" (edited by Workshop for Next-Generation Display Devices, Science Forum Co., Ltd., Jun. 30, 1992) or in "Achievement of Organic ELs and Strategy for Practical Application of Organic ELs" (data and materials obtained by Workshop for Organic Electronic Materials, Hotel Tembo, Ikaho Onsen in Gumma Pref., Jul. 6–8, 1995).

Figure 4:
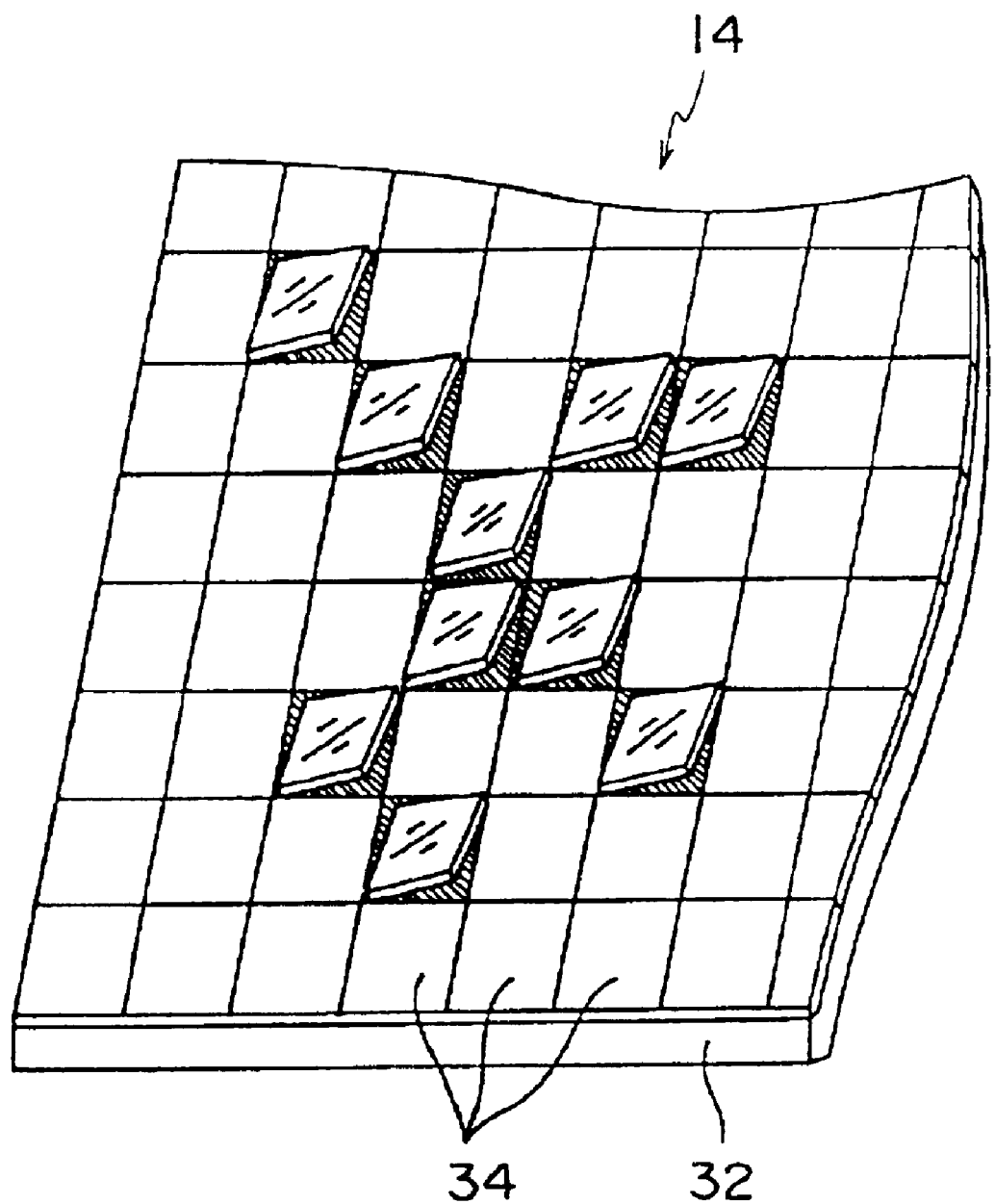
FIG. 4 is a partially enlarged view showing the structure of a portion of a DMD.

As shown in FIG. 4, the DMD 14 is a mirror device comprising micromirrors 34 that are disposed on a SRAM cell (memory cell) 32 and supported by supports, and a large number (i.e., hundreds of thousands to millions) of pixels arranged in a grid-like pattern. A micromirror 34 supported by a support is provided at the top of each of the pixels, and aluminum is deposited on the surface of the micromirror 34. The reflectance of the micromirror 34 is 90% or more. Further, the CMOS SRAM cell 32 having a silicon gate, which is manufactured by an ordinary semiconductor memory manufacturing process, is disposed immediately below the micromirrors 34 via the supports including hinges and yokes. Therefore, the DMD 14 has a monolithic structure.

When a digital signal is written on the SRAM cell 32 of the DMD 14, the micromirror 34 supported by a support is inclined at a range of $\pm\alpha°$ (for example, $\pm10°$) relative to the substrate on which the DMD 14 is disposed, with a diagonal of the mirror being an axis. FIG. 5A shows a state in which the micromirror 34 is inclined at $+\alpha°$ (i.e., a state in which the micrommirror 34 is "on"), and FIG. 5B shows a state in which the micromirror 34 is inclined at $-\alpha°$ (i.e., a state in which the micrommirror 34 is "off"). Therefore, as shown in FIG. 4, by controlling the inclination of the micromirror 34 at each pixel of the DMD 14 in accordance with image signals, light beams made incident on the DMD 14 are reflected toward directions in which the respective micromirrors 34 are inclined. FIG. 4 shows an enlarged portion of the DMD 14, and, as an example, some of the micromirrors 34 are controlled so as to be inclined at $+\alpha°$ or $-\alpha°$. On-off control of the respective micromirrors 34 is carried out by the controller 16 connected to the DMD 14.

Recording operation of the image recording device will be described next. When the color photosensitive material 18 is conveyed at a constant speed by an unillustrated conveying means in a direction of arrow Y (i.e., in a sub-scanning direction; see FIG. 1), and a recording starting point a reaches a position at which light beams are focused thereon by the condenser lens 20 and the reflecting mirror 22, light beams of the respective colors are emitted from the light source 10 by the controller 16. For example, when light beams are emitted from the red organic EL elements 24, red image data corresponding to a plurality of lines is transferred to the DMD 14. In accordance with the image data, on-off control of the micromirrors 34 of the DMD 14 is carried out. When the red light beams emitted from the light source 10 are collimated by the collimator lens 12 and are made incident on the DMD 14, the incident light beams are reflected toward the reflecting mirror 22 when the micromirrors 34 of the DMD 14 are on, and are reflected toward the light absorber 23 when the micromirrors 34 are off. Light beams reflected toward the reflecting mirror 22 are focused onto the recording surface of the color photosensitive material 18 by the condenser lens 20 and the reflecting mirror 22, and red exposure of the plurality of lines is carried out. Further, light beams reflected toward the light absorber 23 are absorbed thereby.

In the same way, light beams are emitted from the green organic EL elements 26 by the controller 16, green image data corresponding to the plurality of lines is transferred to the DMD 14, and green exposure is carried out. Subsequently, light beams are emitted from the blue organic EL elements 28 by the controller 16, blue image data corresponding to the plurality of lines is transferred to the DMD 14, and blue exposure is carried out. In this way, exposure with the light beams of the three colors of R, G, and B can be carried out.

In the present embodiment, the organic EL array is used as the light source. However, since external modulation is carried out by using the DMD, in which a large number of micromirrors serving as reflection type light shutters are arranged in an array, problems such as optical crosstalk caused by the organic EL elements forming a diffusion light source or thermal crosstalk caused by the organic EL elements being provided on a single substrate do not arise. Therefore, high quality images can be obtained. Moreover, since it is not necessary to move an exposure section for scanning exposure or to use a complicated optical system using a polygon mirror and the like, the device can be made compact.

Further, the organic EL array serving as the light source includes the red, green, and blue organic EL elements and can emit light beams of the respective colors. Therefore, a color wheel having filters of the respective R, G, B colors for color separation, a rotating mechanism for mechanically rotating the color wheel, and switching of the filters are not necessary. Accordingly, the device can be made compact, and images can be recorded at high speed.

Furthermore, the organic EL array serving as the light source has an amount of light sufficient for exposure and sufficient durability, and can be easily manufactured by a film-making process such as vapor deposition as compared with arrays of other light emitting elements. Therefore, cost required for the device can be reduced.

As an example, a case has been described in which, as the light source, the organic EL array is used in which the red, green, and blue organic EL elements are formed in a matrix on a single transparent substrate. However, as shown in FIG. 6, a multi-layered organic EL element 52 can be used as the light source. The multi-layered organic EL element 52 is structured such that, on a transparent substrate 36, an organic compound layer 40 including a red light-emitting layer, a transparent electrode 42, an organic compound layer 44 including a green light-emitting layer, a transparent electrode 46, an organic compound layer 48 including a blue light-emitting layer, and an electrode 50 are sequentially laminated, and has dimensions sufficient to expose an entire image recording paper at one time.

In the multi-layered organic EL element 52, by injecting an electric current between the electrodes disposed at both sides of the organic compound layer including a light-emitting layer emitting a light beam of a predetermined color (for example, R), a light beam of the predetermined color is emitted from the light-emitting layer of the organic compound layer interposed between the electrodes. Therefore, light beams of the respective colors can be separately emitted. Namely, the transparent electrode 38, the organic compound layer 40 including the red light-emitting layer, and the transparent electrode 42 form the red organic EL element, the transparent electrode 42, the organic compound layer 44 including the green light-emitting layer, and the transparent electrode 46 form the green organic EL element, and the transparent electrode 46, the organic compound layer 48 including the blue light-emitting layer, and the electrode 50 form the blue organic EL element. With this multi-layered structure, space between the organic EL elements forming the respective layers can be made small, and therefore, higher resolution can be obtained.

Second Embodiment

Hereinafter, a second embodiment of the image recording device of the present invention will be described. The second embodiment is an example in which organic EL arrays, in which the organic EL elements of R, G, and B are linearly arranged respectively, are used as the light source, and external modulation is carried out by using a DMD structured by linearly arranging the micromirrors. Since the present second embodiment is substantially the same as the first embodiment, only the point different from the first embodiment will be described.

Figure 8:
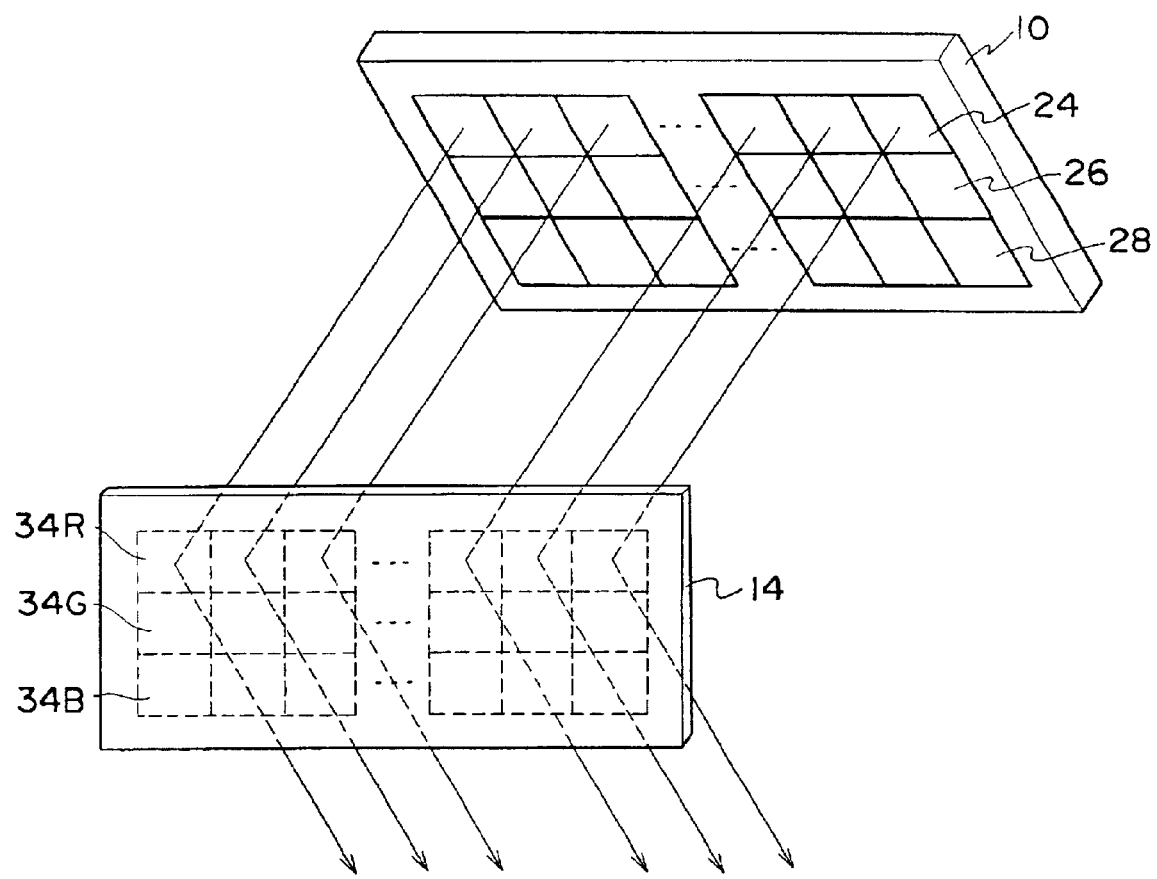
FIG. 8 is a perspective view showing the structure of a portion of the image recording device according to the second embodiment.

First, as shown in FIG. 7, the light source 10 includes the organic EL arrays in which a red organic EL array 24R formed by linearly arranging the red organic EL elements 24 in a predetermined direction, a green organic EL array 26G formed by linearly arranging the green organic EL elements 24 in a predetermined direction, and a blue organic EL array 28B formed by linearly arranging the blue organic EL elements 28 in a predetermined direction, are formed on the single transparent substrate 30. Further, as shown in FIG. 8, the DMD 14 includes a micromirror array 34R in which the micromirrors 34 are linearly arranged in a predetermined direction so as to correspond to the red organic EL array 24R, a micromirror array 34G in which the micromirrors 34 are linearly arranged in a predetermined direction so as to correspond to the green organic EL array 24G, and a micromirror array 34B in which the micromirrors 34 are linearly arranged in a predetermined direction so as to correspond to the blue organic EL array 24B.

In the above image recording device, when light beams are emitted from the red organic EL array 24R by the controller 16, red image data corresponding to one line is transferred to the DMD 14. In accordance with the image data, on-off control of the micromirrors 34R of the DMD 14 is performed. Subsequently, red exposure of the line is carried out in the same manner as the first embodiment. In the same way, light beams are emitted from the green organic EL array 26G, green image data corresponding to the line is transferred to the DMD 14, on-off control of the micromirrors 34G is performed, and green exposure is carried out. Further, light beams are emitted from the blue organic EL array 26B, blue image data corresponding to the line is transferred to the DMD 14, on-off control of the micromirrors 34B is performed, and green exposure is carried out.

In the present second embodiment, the organic EL array is used as the light source. However, since external modulation is carried out by using the DMD, in which a large number of micromirrors serving as reflection type light shutters are arranged in an array, problems such as optical crosstalk caused by the organic EL elements forming a diffusion light source or thermal crosstalk caused by the organic EL elements being provided on a single substrate do not arise. Therefore, high quality images can be obtained.

Moreover, since it is not necessary to move an exposure section for scanning exposure or to use a complicated optical system using a polygon mirror and the like, the device can be made compact. Particularly, in the present second embodiment, the linear micromirror arrays are provided so as to correspond to the organic EL arrays. Therefore, this device is economical, and the light modulator can be made more compact.

Further, the organic EL array serving as the light source includes the red, green, and blue organic EL elements and can emit light beams of the respective colors. Therefore, a color wheel having filters of the respective R, G, B colors for color separation, a rotating mechanism for mechanically rotating the color wheel, and switching of the filters are not necessary. Accordingly, the device can be made compact, and images can be recorded at high speed.

Furthermore, the organic EL array serving as the light source has an amount of light sufficient for exposure and sufficient durability, and can be easily manufactured by a film-making process such as vapor deposition as compared with arrays of other light emitting elements. Therefore, cost required for the device can be reduced.

Third Embodiment

Next, a third embodiment of the image recording device of the present invention will be described. The third embodiment is a case in which the organic EL arrays, in which the organic EL elements of R, G, and B are linearly arranged respectively, are used as the light source, and external modulation is carried out by using a liquid crystal light shutter array.

Figure 9:
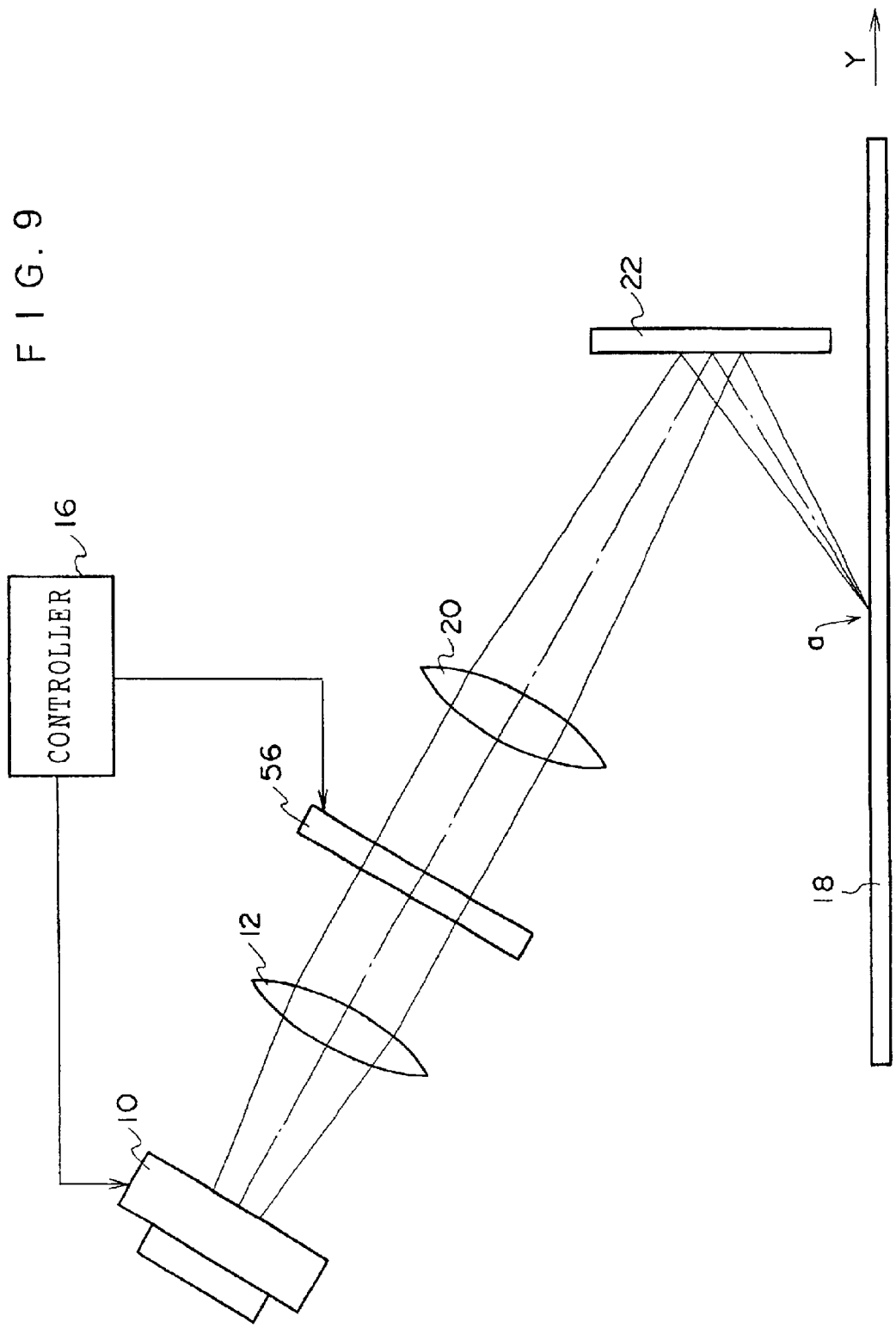
FIG. 9 is a structural view schematically showing the structure of an image recording device according to a third embodiment.

As shown in FIG. 9, the image recording device includes the light source 10 comprised of the organic EL elements of the respective colors of R, G, and B. The collimator lens 12 is disposed at the light-exiting side of the light source 10 and collimates light beams emitted from the light source 10. A liquid crystal light shutter array 56, which serves as a transmission type light modulator, is disposed at the light-exiting side of the collimator lens 12. The light source 10 and the liquid crystal light shutter array 56 are connected to the controller 16. On the optical axes of the light beams transmitted through the liquid crystal light shutter array 56, the condenser lens 20 and the reflecting mirror 22 are disposed so as to focus the light beams transmitted through the liquid crystal light shutter array 56 onto the recording surface of the color photosensitive material 18.

The light source 10 includes the organic EL arrays in which the red organic EL array 24R, the green organic EL array 26G, and the blue organic EL array 28B shown in FIG. 7 are formed on the single transparent substrate 30.

Figure 10:
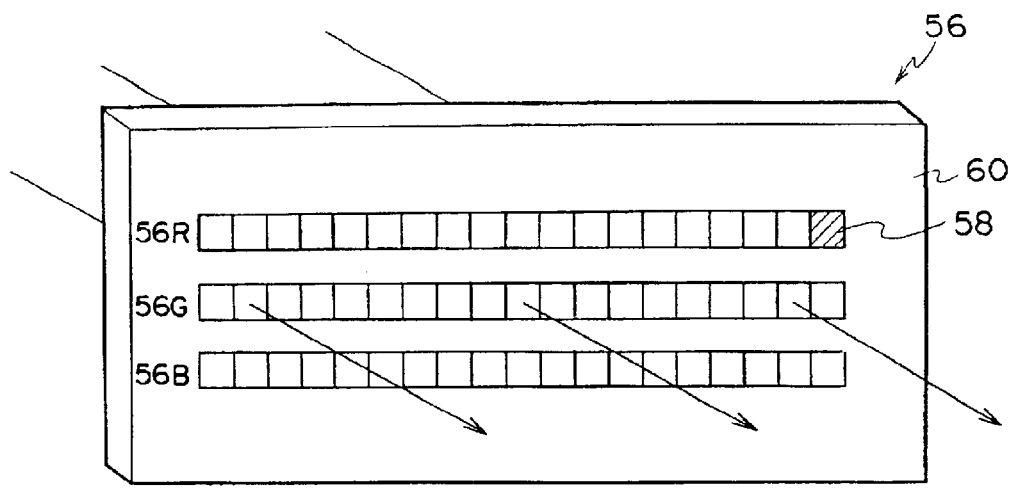
FIG. 10 is a perspective view showing the structure of a liquid crystal light shutter array of the image recording device according to the third embodiment.

As shown in FIG. 10, the liquid crystal light shutter array 56 has a large number of liquid crystal light shutters 58 formed on a substrate 60. The liquid crystal shutter array 56 includes a light shutter array 56R in which the liquid crystal light shutters 58 are linearly arranged in a predetermined direction so as to correspond to the red organic EL array 24R, a light shutter array 56G in which the liquid crystal light shutters 58 are linearly arranged in a predetermined direction so as to correspond to the green organic EL array 26G, and a light shutter array 56B in which the liquid crystal light shutter 58 are linearly arranged in a predetermined direction so as to correspond to the blue organic EL array 28B.

Figure 11:
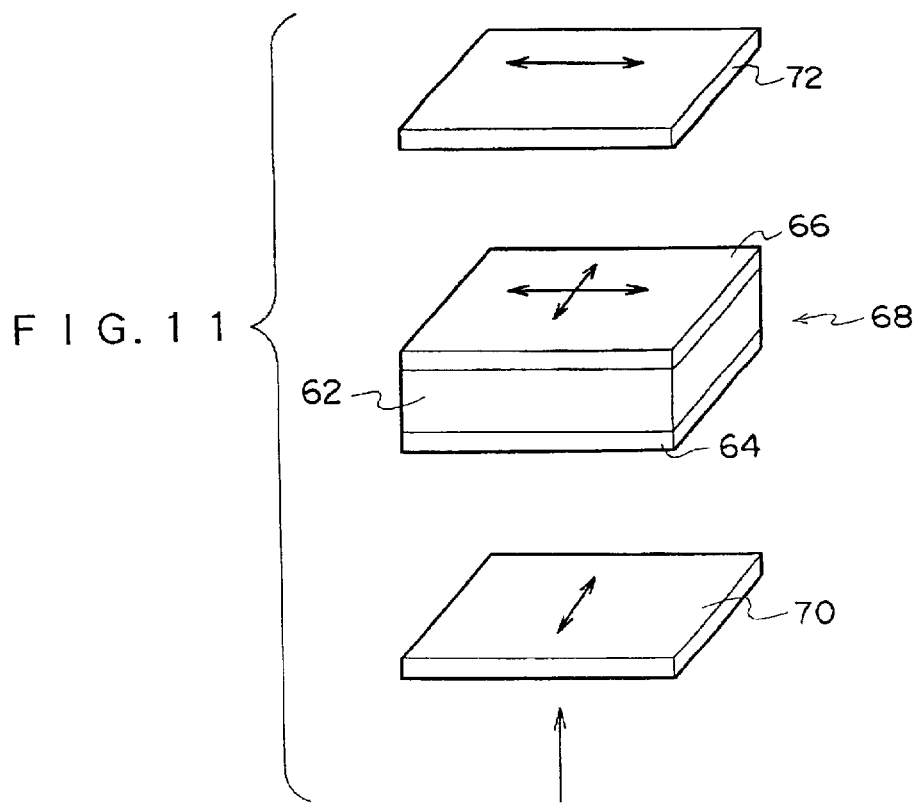
FIG. 11 is an exploded perspective view for explaining the structure of a liquid crystal light shutter.

As shown in FIG. 11, each of the liquid crystal light shutters 58 includes a liquid crystal cell 68 in which a liquid crystal layer 62 is interposed between a transparent electrode 64 at the light-incident side and a transparent electrode 66 at the light-exiting side. A plate-shaped polarizer 70 is disposed at the light-incident side of the liquid crystal cell 68, and a plate-shaped analyzer 72 is disposed at the light-exiting side of the liquid crystal cell 68. The polarizer 70 is an element for making an incident light beam into a linearly polarized light. Specifically, the polarizer 70 separates an incident light beam into two linearly polarized light components and transmits them. The two linearly polarized light components vibrate in directions orthogonal to each other within a plane perpendicular to the direction in which the light advances. A wavelength plate such as a 1/2 wavelength plate, for example, may be used as the polarizer 70. The analyzer 72 is an element for checking whether or not an incident light beam is polarized and the direction in which an incident light beam is polarized, and transmits an incident light beam only when the direction in which the light beam made incident on the analyzer 72 coincides with a predetermined direction. As shown in FIG. 11, the direction in which a light beam is transmitted and polarized by the polarizer 70 may differ by 90° from the direction in which the light beam is transmitted and polarized by the analyzer 72.

When a light beam is made incident on the liquid crystal light shutter 58, in a case in which voltage is not applied to the liquid crystal layer 62 by the transparent electrodes 64 and 66, the light beam is made into a linearly polarized light beam by the polarizer 70, is transmitted through the liquid crystal layer 62 in that state, and is shielded by the analyzer 72. This is the off state of the liquid crystal light shutter 58. In a case in which voltage is applied to the liquid crystal layer 62 by the transparent electrodes 64 and 66, on the other hand, the direction in which liquid crystals in the liquid crystal layer 62 are arranged is changed, and the polarizing direction of the light beam transmitted through the liquid crystal layer 62 is thereby changed. Therefore, by applying to the liquid crystal layer 62 voltage of a predetermined value which enables rotation of the polarizing direction of the light beam by 90°, the light beam can be transmitted through the analyzer 72. This is the on state of the liquid crystal light shutter 58. Accordingly, by controlling the voltage to be applied to the liquid crystal layer 62 in accordance with image signals, on-off control of the light shutter 58 is made possible. The on-off control of the respective light shutters 58 is carried out by the controller 16 which is connected to the liquid crystal light shutter array 56.

Next, recording operation of the above image recording device will be described. When the color photosensitive material 18 is conveyed at a constant speed by an unillustrated conveying means in the direction of arrow Y (i.e., in the sub-scanning direction), and the recording starting point a reaches a position at which light beams are focused thereon by the condenser lens 20 and the reflecting mirror 22, light beams of the respective colors are emitted from the light source 10 by the controller 16. For example, when light beams are emitted from the red organic EL array 24R, red image data corresponding to one line is transferred to the liquid crystal light shutter array 56. In accordance with the image data, on-off control of the light shutters 58 of the light shutter array 56R is carried out. When the red light beams emitted from the light source 10 are collimated by the collimator lens 12 and are made incident on the liquid crystal light shutter array 56, the incident light beams are transmitted through the light shutters 58 of the liquid crystal light shutter array 56 when they are on, and are shielded when they are off. Light beams transmitted through the light shutters 58 are focused onto the recording surface of the color photosensitive material 18 by the condenser lens 20 and the reflecting mirror 22, and red exposure of the line is carried out.

In the same way, light beams are emitted from the green organic EL array 26G by the controller 16, green image data corresponding to the line is transferred to the liquid crystal light shutter array 56, and green exposure is carried out. Subsequently, light beams are emitted from the blue organic EL array 28B by the controller 16, blue image data corresponding to the line is transferred to the liquid crystal light shutter array 56, and blue exposure is carried out. In this way, exposure with the light beams of the three colors of R, G, and B can be carried out.

The organic EL arrays are used as the light source in the present third embodiment. However, since external modulation is carried out by using the liquid crystal shutter array in which a large number of liquid crystal light shutters are arranged in an array, problems such as optical crosstalk caused by the organic EL elements forming a diffusion light source or thermal crosstalk caused by the organic EL elements being provided on a single substrate do not arise. Therefore, high quality images can be obtained.

Moreover, since it is not necessary to move an exposure section for scanning exposure or to use a complicated optical system using a polygon mirror and the like, the device can be made compact. Particularly, the liquid crystal light shutter array, which serves as a transmission type light modulator, is used in the present embodiment. Therefore, no light absorbers are necessary, and the structure of the device can be made simpler.

Further, the organic EL array serving as the light source includes the red, green, and blue organic EL elements and can emit light beams of the respective colors. Therefore, a color wheel having filters of the respective R, G, B colors for color separation, a rotating mechanism for mechanically rotating the color wheel, and switching of the filters are not necessary. Accordingly, the device can be made compact, and images can be recorded at high speed.

Furthermore, the organic EL array serving as the light source has an amount of light sufficient for exposure and sufficient durability, and can be easily manufactured by a film-making process such as vapor deposition as compared with arrays of other light emitting elements. Therefore, cost required for the device can be reduced.

In the above description, an example has been described in which the liquid crystal light shutter array is used as a transmission type light modulator. However, transmission type light shutter arrays using ferroelectric ceramics such as $LiNbO_3$, PLZT, and $LiTaO_3$ may also be used. Further, the liquid crystal layer of the liquid crystal light shutter may be formed from any of nematic liquid crystal materials, cholesteric liquid crystal materials, smectic liquid crystal materials, and ferroelectric liquid crystal materials.

In the above first to third embodiments, there have been described examples in which only the organic EL elements are used to form the array serving as the light source. However, an LED array including LEDs which have higher intensity than the organic EL elements may be used as the red light source, and the organic EL arrays may be used as the green and blue light sources. For example, an LED array may be used in place of the red organic EL array 24R of the second embodiment shown in FIG. 7. The emission intensity of the organic EL elements decreases in the order of green, blue, and red, and the intensity ratio thereof is about 100:80:10. Therefore, when exposure is carried out on silver halide photosensitive materials which have spectral sensitivity in the visible region, such as color papers whose sensitivity decreases by about one digit in the order of the blue sensitive layer, the green sensitive layer, and the red sensitive layer, the amount of red light for exposure becomes insufficient. However, by using the LED array as the red light source, the amount of light for exposure of each of the colors can be obtained and, even in the case of exposure on color papers or the like, high-quality images can be obtained at high speed.

As described above, the image recording device of the present invention uses the light source including the organic electroluminescence elements, and modulates light beams emitted from the light source by using the light modulator in which the light shutters are arranged in an array. Therefore, the present invention has effects that no crosstalk is generated and high-quality images can be obtained.

Further, since the light source which can independently emit light beams of red, green, and blue is used, switching of a color separation filter is not necessary. Therefore, the present invention has effects that the device can be made small and images can be recorded at high speed.

Furthermore, the organic EL element has an amount of light sufficient for exposure and sufficient durability, and is easy to manufacture. Therefore, the present invention has an effect that cost required for the image recording device can be reduced.

What is claimed is:

1. An image recording device comprising:
   a light source for independently emitting red, green and blue light beams, the light source having an organic electroluminescence element; and
   a light modulator for modulating the light beams from the light source, the light modulator having light shutters arranged in an array, the light shutters being controlled on-off for each color in accordance with signals representing an image to be recorded.

2. The image recording device of claim 1, wherein the light source comprises organic electroluminescence elements emitting red light beams, organic electroluminescence elements emitting green light beams and organic electroluminescence elements emitting blue light beams, the respective organic electroluminescence elements being arranged in a predetermined direction for each color.

3. The image recording device of claim 1, wherein the light source comprises organic electroluminescence elements emitting red light beams, organic electroluminescence elements emitting green light beams and organic electroluminescence elements emitting blue light beams, the organic electroluminescence elements being arranged in a matrix.

4. The image recording device of claim 1, wherein the light source comprises a light-emitting layer for emitting a red light beam, a light-emitting layer for emitting a green light beam and a light-emitting layer for emitting a blue light beam, and the layers are laminated to emit the light beams in the same direction.

5. The image recording device of claim 1, wherein the light modulator comprises a light shutter array comprising light shutters arranged in an array, with each of the light shutters having a cell whose light transmittance can be adjusted on the basis of an image signal.

6. The image recording device of claim 1, wherein the light modulator comprises a micromirror array device comprising micromirrors arranged in an array, with reflecting angles of the micromirrors being adjustable on the basis of an image signal.

7. The image recording device of claim 2, wherein the light modulator comprises a light shutter array comprising light shutters arranged in an array, with each of the light shutters having a cell whose light transmittance can be adjusted on the basis of an image signal.

8. The image recording device of claim 2, wherein the light modulator comprises a micromirror array device comprising micromirrors arranged in an array, with reflecting angles of the micromirrors being adjustable on the basis of an image signal.

9. The image recording device of claim 3, wherein the light modulator comprises a light shutter array comprising light shutters arranged in an array, with each of the light shutters having a cell whose light transmittance can be adjusted on the basis of an image signal.

10. The image recording device of claim 3, wherein the light modulator comprises a micromirror array device comprising micromirrors arranged in an array, with reflecting angles of the micromirrors being adjustable on the basis of an image signal.

11. The image recording device of claim 4, wherein the light modulator comprises a light shutter array comprising light shutters arranged in an array, with each of the light shutters having a cell whose light transmittance can be adjusted on the basis of an image signal.

12. An image recording device according to claim 4, wherein the light modulator comprises a micromirror array device comprising micromirrors arranged in an array, with reflecting angles of the micromirrors being adjustable on the basis of an image signal.

* * * * *